Dec. 29, 1970
M. W. SMITH ET AL
3,550,388
LOCATING AND ATTACHMENT MEANS FOR
A SUBMERSIBLE VEHICLE
Filed Nov. 18, 1968
2 Sheets-Sheet 1
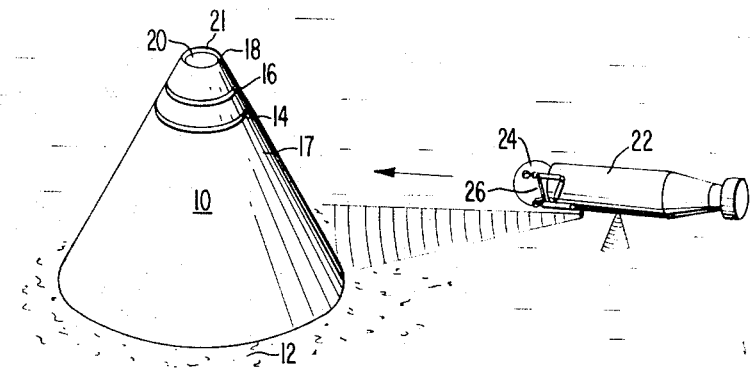
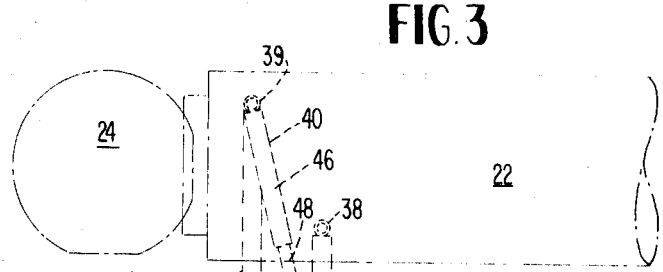
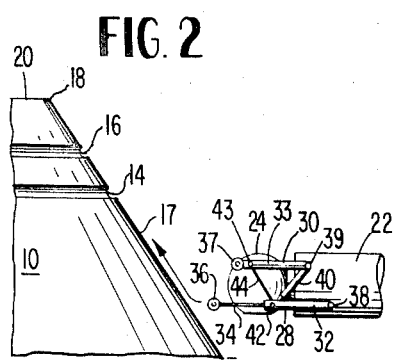
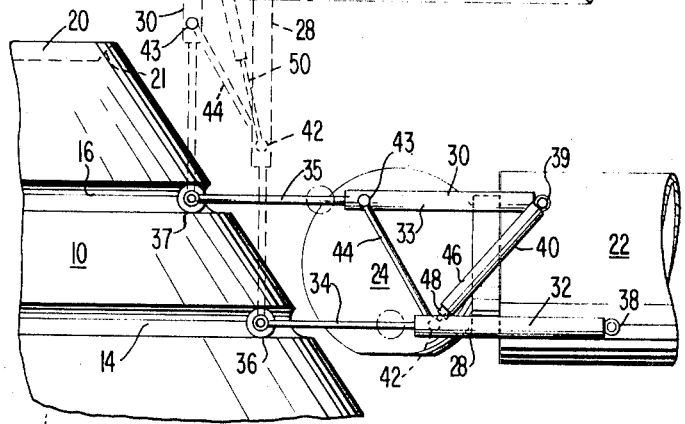
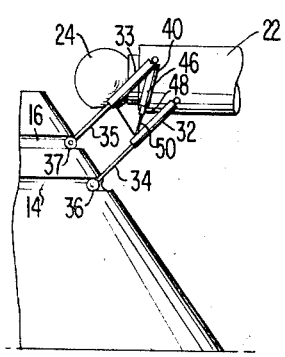
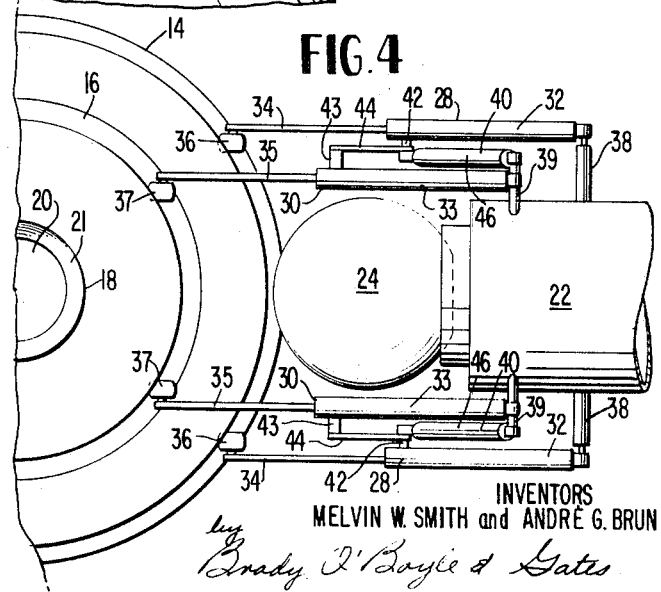
INVENTORS
MELVIN W. SMITH and ANDRÉ G. BRUN
by Brady O'Boyle & Gates
ATTORNEYS

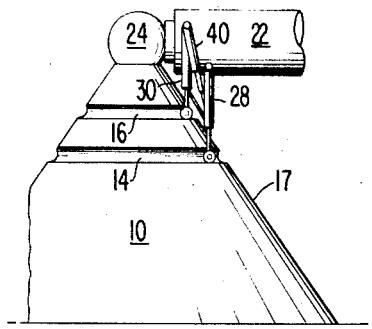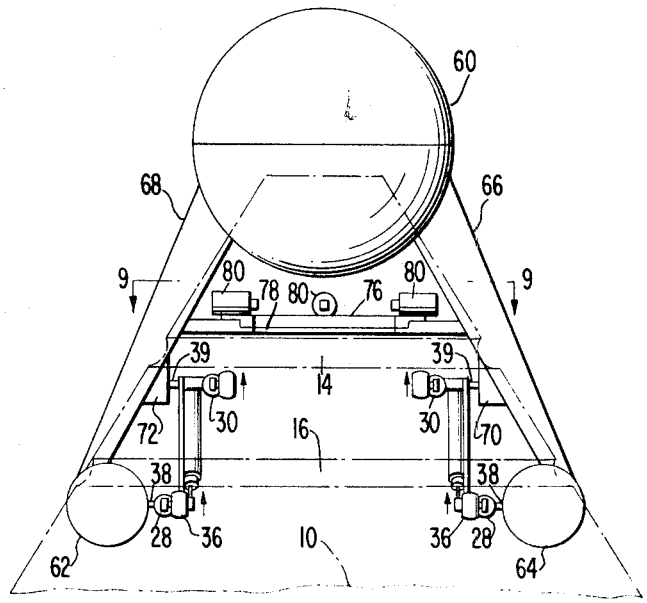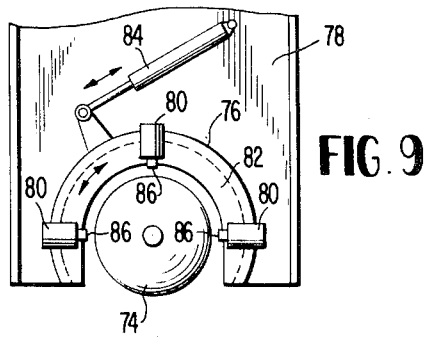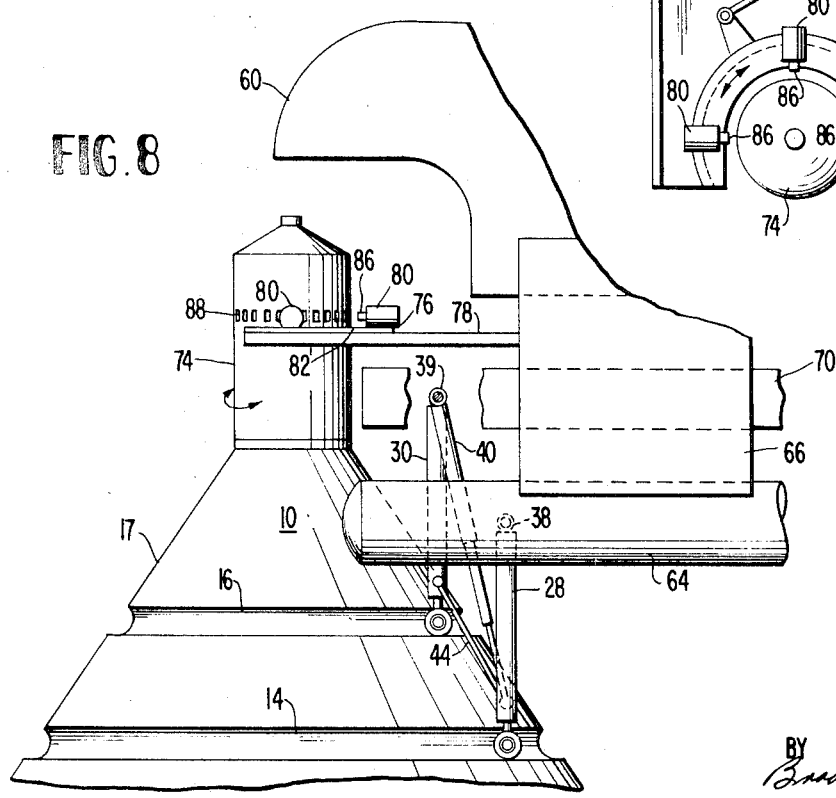

United States Patent Office 3,550,388
Patented Dec. 29, 1970

3,550,388
LOCATING AND ATTACHMENT MEANS FOR A SUBMERSIBLE VEHICLE
Melvin Wilmer Smith, Edgewater, Md., and André Georges Brun, Paris, France, assignors to Westinghouse Electric Corporation, Pittsburgh, Pa., a corporation of Pennsylvania
Filed Nov. 18, 1968, Ser. No. 776,478
Int. Cl. B63c 11/34
U.S. Cl. 61—69                      16 Claims

ABSTRACT OF THE DISCLOSURE

A system of extensible jacks on a submersible vehicle which is adapted to locate itself precisely on a conical or a sloping structure placed beneath the surface of the water and includes one or more recessed grooves on the outer surface thereof to which the vehicle attaches itself.

CROSS REFERENCE TO RELATED APPLICATION

This invention is related to an application Ser. No. 776,319 entitled "Underwater Oil or Gas Facility" filed on Nov. 18, 1968 in the name of the present inventors and assigned to the assignee of the present invention.

BACKGROUND OF THE INVENTION

Underwater vehicles such as submarines are well known to those skilled in the art. Such vehicles are known for use not only in the military but also for pleasure and commercial purposes as well. For example, oceanography today is vitally concerned with exploration and discovery beneath the sea and many new types of equipment and apparatus for investigating and studying this new science have resulted therefrom. Moreover, manipulators of various types have been incorporated with submersible vehicles for performing various work functions such as repair, operations, or simply removing submerged objects from the ocean floor or other submerged structures. Additionally, submersible vehicles are presently known which include detachable man carrying capsules.

Not only does the submarine and like vehicles find application in the field of oceanography but the present pursuit of establishing and maintaining offshore oil and gas wells finds application as well. More particularly, in the copending related application noted above there is disclosed means for establishing and maintaining an oil or gas well on the floor of the ocean. Such means comprises a frusto-conical structure constructed of concrete and steel which can serve not only as a template for the drilling of the well but as an underwater platform, a production facility, a separation facility and a storage facility. The structure moreover, provides protection of oil production equipment which can be housed either totally within or in the vicinity of the top or apex of the conical structure. Furthermore, the production facility may be of the manned type wherein a work chamber is located in the structure surrounding the production facility or may take the form of an unmanned station wherein the production facility comprises a removable package including valves and chokes, etc., which must be periodically replaced and which is adapted to automatically shut down and seal off the well upon its removal.

SUMMARY OF THE INVENTION

The present invention is directed to means for positioning a submersible vehicle on an underwater structure such as a frustum of a cone and attaching itself thereto for delivering and/or removing a payload in the form of an equipment package or manned capsule. It comprises a jacking system mounted on a submersible vehicle and is adapted to locate and attach itself to a pair of concentric parallel grooves around the outer surface of a conical structure perpendicular to its axis. The jack system comprises a first and a second pair of extensible jacks respectively located on each side of the bow of the submersible. The pairs of jacks are adapted to extend forwardly therefrom and seek out and engage first the lower groove and then the upper groove of the conical structure. A third or transverse jack is coupled between each pair of jacks from the rear of one to the front portion of the other while a connecting rod is coupled between the front portions of the upper and lower jacks. The system is operable to permit the submersible to engage the pair of grooves, lift itself above the cone, and lower itself into engagement with the top of the structure.

BRIEF DESCRIPTION OF THE DRAWINGS

FIG. 1 is a perspective view of a submersible vehicle approaching a frusto-conical underwater structure having a pair of concentric parallel grooves located near the top thereof;

FIG. 2 is a partial profile view of one embodiment of the subject invention approaching the conical structure shown in FIG. 1;

FIG. 3 is an enlarged partial profile view of the embodiment of the subject invention shown in FIGS. 1 and 2 attached to the frusto-conical structure in a first position and a second or erect position;

FIG. 4 is a partial plan view of the embodiment of the subject invention shown in FIG. 3;

FIG. 5 is a partial profile of embodiment shown in FIG. 2 in a partially erect position;

FIG. 6 is a partial profile view of the embodiment shown in FIG. 2 in a lowered position on the top of said frusto-conical structure;

FIG. 7 is a front profile view of a second embodiment of the subject invention;

FIG. 8 is a partial side profile view of the embodiment shown in FIG. 7; and

FIG. 9 is a sectional view of the embodiment shown in FIG. 7 taken along the lines 9—9.

DESCRIPTION OF THE PREFERRED EMBODIMENTS

Preferring now to the figures and particularly to FIG. 1 there is disclosed a generally frusto-conical structure 10 which is adapted to include and house an underwater oil and/or gas well facility located on the bottom 12 of the sea. The structure 10 is composed of concrete and steel thus providing a structure which is simple to construct and can be placed on the sea bottom at extremely great depths. Furthermore, the concrete and steel construction provide a relatively long life in the environment of sea water. The structure 10, moreover, is illustrated and described in greater detail in the aforementioned related application entitled "Underwater Oil or Gas Facility."

The frusto-conical underwater structure 10 additionally includes a pair of concentric parallel grooves 14 and 16 on and around the outer surface 16 of the structure 10 perpendicular to its axis near its top or apex. The grooves 14 and 16 are located a predetermined distance apart at a selected distance from the apex 18 of the structure 10 which is additionally adapted to include a circular opening 20 for providing access into the interior thereof.

FIG. 1 additionally discloses a submarine vehicle 22 approaching the frusto-conical structure 10, being guided thereto by suitable underwater object locating apparatus such as sonar. A spherical member such as a life support capsule 24 is removably attached to the front or bow of the vehicle 22. The capsule 24 is adapted to be transported to the top 18 of the frusto-conical structure 10 by means of the submarine 22 and lowered into a nesting position in the opening 20. This operation will be described more fully as the present specification proceeds. A locating and attachment means comprising an extensible jack system is shown generally by reference numeral 26. The extensible jack system 26 is located on the bow of the submarine 22 and comprises two identical pairs of extensible jacks which respectively protrude forwardly thereof on each side of the capsule 24.

Referring now to FIG. 2 and the extensible jack system 26, each pair of jacks comprises a first and a second forwardly extensible jack 28 and 30 attached to the bow of the submarine 22 on each side of the capsule 24. The jacks 28 and 30 are located in a mutually parallel position with the upper jack 30 being positioned slightly forward of the lower jack 28. Each of the jacks 28 and 30 moreover include respective cylinders 32 and 33, extensible rod members 34 and 35, and attachment elements 36 and 37 located on the ends thereof. The jacks 28 and 30 are attached to the submarine 22 by means of the pivot members 38 and 39. A third or transverse jack 40 is diagonally coupled from the pivot 39 of the upper jack 30 to a pivot member 42 on the forward portion of the lower jack cylinder 32. Additionally, a solid connecting rod 44 is coupled between the pivot member 42 of the lower jack 32 to the pivot member 43 located on the forward portion of the upper jack cylinder 33.

Referring briefly to FIG. 4 and as noted above the jacks shown in FIGS. 2 and 3 are duplicated on the opposite sides of the capsule 24 so that the complete jacking system comprises two pairs of jacks 28, 30, and 40 and the connecting rod 44. The third jack 40 differs from the jacks 28 and 30 in that it is comprised of two telescoping cylinders 46 and 48 and an extensible rod 50 as more fully shown in the phantom view included in FIG. 3.

The operation of the subject apparatus consists in the approach of the submarine 22 to the frusto-conical structure 10 as shown in FIG. 1. It should also be pointed out that the continuous curvilinear outer surface 17 of the structure 10 permits omnidirectional approach thereto. Upon reaching the proximity of the frusto-conical structure 10, the lower jacks 28 on each side of the capsule 24 are extended such that the attachment means 36 of both jacks extend beyond the attachment means 37 in connection with the upper jacks 30. The attachment means 36 which may be comprised of roller means such as an inflatable tire or rotatable ball contact the outside surface 17. Since there are two such attachments 36, one on each side of the capsule 24, the submarine straddles an arcuate portion of the outside surface 17 and rides up the surface until the first or lower groove 14 is reached whereupon the attachment means 36 engage the groove 14. Following this, the upper jack 30 on each side of the capsule 24 is extended until the attachment means 37 which is identical to the means 36 engages the upper groove 16. The attachment means 36 and 37 are subsequently expanded so that a locking action is effected with the grooves 14 and 16 so that the submarine is unable to move backwards or laterally with respect to the conical structure 10. Next the diagonal or transverse jack 40 is extended partially as shown in FIG. 5 and then fully as shown in the phantom view of FIG. 3 at which time the submarine 22 is raised until the jacks 28 and 30 are in a vertical position at which time the capsule 24 will be positioned directly above the opening 20 of the structure 10. The jacks 28 and 30 are subsequently contracted simultaneously whereupon the submarine 22 and the capsule 24 are lowered until the capsule 24 snugly fits into registration with the opening 20 and the concave inner surface 21 thereof. It should also be pointed out that suitable sealing means, not shown, can be provided between the inner edge 21 of the opening 20 and the capsule 24 for providing a seal surface cleaning system and a water tight seal therebetween when the capsule 24 is lowered into its nesting position on the structure 10. This latter position is illustrated in FIG. 6.

When the capsule 24 is located on top of the structure 10 access may be had into the interior of the frusto-conical structure 10 from the capsule 24. For example, a human operator may be transported inside of the capsule 24 to the structure 10 so that when docking as shown in FIG. 6 is completed, the structure 10 may be entered from the capsule 24 through the opening 20. Upon completion of its mission in the frusto-conical structure 10, the submarine 22 raises itself by extending the jacks 28 and 30 simultaneously and reversing the procedure previously described.

Proceeding now to FIGS. 7, 8 and 9, a second embodiment of the present invention is disclosed wherein a tri-hull submarine comprising a main hull 60 and two lower hulls 62 and 64 includes a jacking system similar to that shown in FIGS. 1 through 6. More particularly, and referring now to FIG. 7, the lower hulls 62 and 64 are suspended beneath the main hull 60 by means of extending frame members 66 and 68. FIG. 7 moveover discloses a front profile view of the three hulls 60, 62 and 64 in combination with a phantom view of the frusto-conical structure 10 including the docking grooves 14 and 16, being illustrative of the fact that the submersible when in the vicinity of the top of the structure adapts a straddling position with respect thereto. When jacks 40 are extended as shown in FIG. 8 the submarine can pass completely over the top of the structure 10. The jacks 28, 30 and 40 assume a position similar to that shown in FIG. 6. The jacking system in the present embodiment although containing the same elements 28, 30, 40 and 44 they are necessarily mounted in a manner as shown to accommodate the tri-hull configuration of the submarine. The extensible lower jacks 28 are pivotally mounted on the hulls 62 and 64 by means of the pivots 38; however, the upper pair of jacks 30 are pivotally mounted on frame members 70 and 72 running parallel with the lower hulls 62 and 64 respectively intermediate the upper hull 60, the distance being governed by the separation of the grooves 14 and 16 on the structure 10. The pivot 39 of the upper jack, therefore, is located in the members 70 and 72, respectively.

The embodiment shown in FIGS. 7 and 8 is adapted to transport a cylindrical structure 74 which may be for example a self-contained oil production facility, to and from the top of the frusto-conical structure 10. This may be performed by means of a manipulator 76 mounted on a sliding frame 78 located beneath the upper hull 60. This is illustrated in FIG. 8. Furthermore, the manipulator 76 is shown in greater detail in FIG. 9 wherein gripper members 80 are mounted on a swivable plate member 82 which when energized by a jack 84 turns a predetermined distance when extended. Furthermore, the gripper members 80 include fingers 86 which extend into a plurality of recesses 88 in the structure 74.

In the operation of the second embodiment, the cylindrical structure 74 is retracted under the front portion of the upper hull 60. The tri-hull submarine approaches the frusto-conical structure 10 and extends the lower pair of jacks 28 to contact the outer surface 17. The submarine rides up the outer surface 17 whereupon the lower jacks 28 engage the recess 16 by means of the attachment means 36. The upper jacks 30 are extended and the three hulls are raised by means of the transverse jack 40 at which time the sliding frame 78 is extended forwardly until it is directly over and aligned with the top of the frusto-conical structure 10 at whach time the jacks 30 and 28 contract lowering the structure 74 into registration with the top of the structure 10. The manipulator 76 is then energized to rotate the structure 74 into connection with the structure 10. If the structure 74 comprises a self-contained oil production facility it is adapted for automatic coupling and decoupling into the well by means of the rotation of the structure by means of the manipulator 76.

Whereas the embodiment shown in FIGS. 1 through 6 permits location and attachment to a frusto-conical underwater structure by means of a single hull submarine 22 for locating a capsule 24 and providing access into the interior of the structure 10, the second embodiment shown with respect to FIGS. 7 and 8 discloses the concept of attachment to a frusto-conical structure and connecting and/or removing a completely automatic well production facility such as the structure 74 which requires periodic replacement of the complete package.

While the present embodiments have been disclosed with a certain degree of particularity, it should be observed that the present disclosure has been made by way of example only. It is not desired therefore that the invention be limited specifically to the disclosed embodiments but it is to be understood that all equivalents, alterations and modifications within the spirit and scope of the present invention are herein meant to be included.

We claim as our invention:

1. Apparatus of the type described for use in connection with an underwater structure including substantially circular groove means located on the outer surface of said structure, said groove means being substantially perpendicular to the axis of said structure, comprising in combination:
    a submersible vehicle; and
    locating and attachment means mounted in proximity to one end portion of said vehicle and comprising at least one pair of extensible jacks pivotally mounted one on each side of said one end portion of said vehicle, said at least one pair of jacks additionally including engagement means attached to one extremity thereof for contacting the outer surface of said structure when extended, engaging said groove means when contacted, and selectively locking said at least one pair of jacks to said structure.

2. The invention as defined by claim 1 and additionally including at least a second pair of extensible jacks pivotally mounted one on each side of said end portion above said first pair of extensible jacks, providing upper and lower pairs of extensible jacks thereby and wherein said first and said second pair of extensible jacks each are disposed substantially parallel relative to one another, and said first or lower pair of jacks being adapted to initially engage said groove means.

3. The invention as defined by claim 2 wherein said groove means comprises a first and a second substantially parallel groove and wherein said first pair of jacks is adapted to engage said first groove and said second or upper pair of extensible jacks is adapted to engage said second groove.

4. The invention as defined by claim 3 and additionally including a pair of transverse jacks coupled respectively between said upper and lower pairs of extensible jacks for altering the position of said upper and lower pairs of jacks simultaneously from a first position to a second position while locked to said structure.

5. The invention as defined by claim 4 wherein each of said pairs of upper, lower and transverse jacks comprises at least one cylinder and at least one movable extension rod mounted therein and including means for connecting the cylinder of said transverse jack to one end of the cylinder of the upper jack and the extensible rod of said transverse jack to the opposite end of said cylinder of the lower jack.

6. The invention as defined by claim 5 and additionally including a connecting rod respectively coupled between corresponding ends of the cylinders of said upper and lower pairs of extensible jacks.

7. The invention as defined by claim 5 wherein said pair of transverse jacks each includes at least two telescoping cylinders and a movable extension rod mounted therein.

8. The invention as defined by claim 2 wherein said submersible vehicle additionally includes a separable member attached to said one end portion of said vehicle and located between said first and said second pair of extensible jacks, and said submersible vehicle being adapted to deliver said member to the top of said underwater structure by means of the operation of said first and said second pair of extensible jacks.

9. The invention as defined by claim 1 wherein said engagement means attached to one extremity of said first and second pair of jacks comprises roller means.

10. The invention as defined by claim 1 wherein said engagement means comprises selectively expandable and deflatable roller means attached to corresponding extremities for engagement with and locking to said groove means by rolling along the outer surface of said structure until said groove means are reached whereupon expansion of said roller means locks said jacks in position on said structure and subsequent deflation releases said roller means.

11. The invention as defined by claim 1 wherein said submersible vehicle additionally includes manipulator means mounted thereon and being adapted to be moved forwardly of said first and second jair of jacks for performing a work function at the top of said underwater structure.

12. The invention as defined by claim 11 wherein said submersible vehicle comprises a multiple hull vehicle including means for supporting said manipulator means and said first and said second pair of extensible jacks therebetween.

13. Apparatus of the type described, comprising in combination:
    an underwater structure having a base portion adapted to rest on the bottom of the sea and an inwardly sloping outer wall surface including engagement means for a submersible vehicle on said outer wall surface;
    a submersible vehicle; and
    locating and attachment means mounted in proximity to one end portion of said vehicle comprising at least one pair of extensible jacks pivotally mounted one on each side of said one end portion of said vehicle, said jacks additionally including respective engagement means attached to one extremity thereof for contacting said sloping outer wall surface and engaging said engagement means of said structure.

14. The invention as defined by claim 13 wherein said engagement means for a submersible vehicle comprises at least one docking groove in said outer wall surface.

15. The invention as defined by claim 13 wherein said engagement means for a submersible vehicle comprises at least one continuous docking groove in said outer wall surface.

16. The invention as defined by claim 13 wherein said engagement means for a submersible vehicle comprises a pair of substantially parallel docking grooves on said outer wall surface.

References Cited
UNITED STATES PATENTS

| | | | |
|---|---|---|---|
| 3,166,123 | 1/1965 | Watkins | 166—46 |
| 3,265,130 | 8/1966 | Watkins | 61—69X |
| 3,381,485 | 5/1968 | Crooks et al. | 214—1X |
| 3,451,224 | 6/1969 | Colechia et al. | 61—69 |
| 3,463,226 | 8/1969 | Johnson | 61—69X |

J. KARL BELL, Primary Examiner

U.S. Cl. X.R.
114—16; 166—5